June 8, 1937. W. F. ALDER 2,082,781
METHOD, APPARATUS, AND MOTION PICTURE FOR SIMULATING RELATIVE
DISTANCES OF OBJECTS IN PICTURIZATION ON A PLANE SURFACE
Filed April 19, 1933 4 Sheets-Sheet 3

INVENTOR
W. F. ALDER
By
Hazard & Miller
ATTORNEYS

June 8, 1937.   W. F. ALDER   2,082,781
METHOD, APPARATUS, AND MOTION PICTURE FOR SIMULATING RELATIVE
DISTANCES OF OBJECTS IN PICTURIZATION ON A PLANE SURFACE
Filed April 19, 1933    4 Sheets-Sheet 4

Patented June 8, 1937

2,082,781

UNITED STATES PATENT OFFICE 2,082,781

METHOD, APPARATUS, AND MOTION PICTURE FOR SIMULATING RELATIVE DISTANCES OF OBJECTS IN PICTURIZATION ON A PLANE SURFACE

William F. Alder, Altadena, Calif., assignor, by direct and mesne assignments, of one-half to Ralph P. Merritt, individually, Fresno, Calif., and one-half to said Merritt as trustee Application April 19, 1933, Serial No. 666,848

54 Claims. (Cl. 88—16.6)

In the production of motion pictures, various attempts have been made to simulate the relative distances of various objects in the picturization, that is, the projection, of motion pictures on a screen. Such attempts have, as a rule, been unsuccessful or, where giving a simulation of binocular vision, have relied upon the use of complementary colors with supplemental viewing devices. Attempts have been made to secure this simulation of relative distance of objects, that is, depth in the picture, by obtaining a lateral movement of the image on successive frames or panels of a film, whereby when the picture is projected on the screen the successive images are displaced slightly, thus giving to the spectator the sense of depth in the picture.

The system of obtaining depth or simulating relative distances of objects by lateral displacement of the image on successive frames or panels of the film, is difficult to obtain accurately, as, if the displacement is too great, a movement of the image will be obtained on the screen which will be visible to the eye, thus giving a shifting or vibration of the picture, which is objectionable. If the lateral shift of the image is insufficient, the eye does not interpret the successive pictures as giving the effect of relief or depth in the photography.

I have ascertained that there is, apparently, a relation between the displacement of the successive images laterally one from another on a film and the effect produced in binocular vision in obtaining the sense of distance and depth in nature, that is, in binocular vision causing the objects in the foreground to stand out beyond those in the background, and also giving a roundness or contour to different objects in natural vision, which does not occur in the usual plane photography.

In connection with my invention, I have developed a mathematical relation between the distances of objects from the eye and their relative displacement in binocular vision, thus showing the amount of relative displacement when objects are viewed by both eyes simultaneously and the impression created of distance, contour, and relief, as in nature.

In motion picture photography, for the lateral displacement of images on successive frames or panels of the film, I have also developed a mathematical relation for the displacement of the image in relation to the distances of the various objects from the camera lens and film. This mathematical relationship shows that for objects of different distances there are various lateral displacements, and also that it is necessary to have substantially the lateral displacement in accordance with the formula to cause an observer to receive an impression similar to that of binocular vision.

The effect of depth in motion pictures can be obtained by viewing a series of single pictures in rapid succession, in which each picture differs from the preceding one by having the image of the solid object or objects on the film displaced a certain distance. This distance and the time element involved are critical within certain narrow limits which govern the results and effect on the observer. It has been found that the phenomena of persistence of vision for most people is about one-twelfth of a second. Therefore, the amount of effective displacement is that which occurs in about one-twelfth of a second. The standard speed for taking and projecting motion pictures is now about twenty-four panels or frames per second, this being raised from the standard of sixteen to twenty-four to reconcile the synchronizing of sound with the pictures. This speed of twenty-four panels or frames per second gives a factor of safety of two, to provide for abnormal acuity of vision.

There are various ways in which the images on successive frames or panels of a moving picture film can be displaced laterally. One principle involves the lateral bodily displacement of the film and the lens. Such displacement may be at right angles to the line on which the picture is being taken, or at any suitable angle to this. Usually, to obtain the greatest relative displacement of the image, it is of advantage to have such displacement laterally, that is, perpendicular to the line in which the camera is focused. It is also desirable to have the images shift from one side to the other of a center line. This may be done without having regard to the distance the objects are from the camera, in which case the reciprocating motion of a film across the center camera axis may be in a straight line, or a consideration may be given to the location of the main objects and have the film and lens oscillate with an arcuate movement, the arc being variable in accordance with the radius of the principal objects from the camera. Procedures such as this may be accomplished in accordance with the apparatus and procedure set forth in my patent, Motion picture apparatus, No. 1,850,615, issued March 22, 1932, and also in my copending application for Cyclic oscillator for motion picture cameras, filed Nov. 6, 1929, Serial No. 405,142.

My invention also comprehends the appliance and manner of laterally displacing the image of successive frames or panels of a moving picture film by the use of multiple segmental mirrors, these mirrors being spaced apart, one from the other, and each mirror being a segment, the segments being attached together, as on a shaft, to rotate in unison, and the incident rays of light from the objects photographed are reflected from the segmental rotating mirrors through a camera lens to the film. On account of the segmental mirrors being displaced along the axis of rotation, the image formed by the light reflected from successive segments will be laterally displaced on the film from the segment immediately preceding or following. In this procedure, the camera shutter and film feed is operated so that during the time interval in which the edge of a segment passes across the optical path through the lens to the film, the film is being moved forward and is obscured by the camera shutter. Therefore, it is necessary to have a synchronous drive motion between the camera film feed, the camera shutter, and the rotating mechanism for the segmental mirrors.

The effect of the multiple mirrors is to give a certain maximum displacement on the film for each image, which displacement, if it occurs within the time of persistence of vision (one-twelfth second for normal eyes) will be interpreted by the eye as having a certain focal position in respect to depth in the picture.

In regard to the use of segmental mirrors; each segment spaced a certain distance apart considered axially; I have developed an appliance for varying the spacing between the mirrors to obtain a correct lateral displacement of the images on the film in accordance with the distance of the objects and the speed with which successive images are taken and are observed in the projection of the pictures from the film. In this connection, I have developed a mechanical appliance for adjusting the spacing of the mirrors, which may be regulated in accordance with the mathematical formula above, which formula ascertains the correct spacing of the mirrors for different variables, such as the distance of objects, and the time or speed of taking the successive pictures, and by this mechanical appliance the distance apart of the mirrors may be changed while the pictures are being taken.

A feature, therefore, of my invention involves the relationship between a mathematical formula for the proper spacing of the segments of the mirror and the appliances for obtaining this spacing.

My invention comprehends the lateral displacement of successive images on a film, in which this displacement is in accordance with an apparently fundamental mathematical formula which I have developed to secure the correct displacement under varying conditions. When the conditions of this formula are followed out and the pictures projected in the standard manner, the effect of distance or relief in pictures as given in bi-ocular vision, is substantially obtained for normal observers. In regard to the projection when enlargement is made of the pictures in projection on the screen, I have ascertained that this has very little detrimental effect on account of the magnifying or exaggeration of the film displacement on account of the projected images being so much larger than the images on the film.

Another feature of my invention comprehends the control of the path of light, that is, the formation of the image, by the various displacement methods and appliances whereby the light forming the image on the film is laterally displaced in a continuous manner in accordance with a definite mathematical formula which I have worked out, dealing with the relationship of the image movement, the distance of objects, and speed of taking of the pictures, and focal length of the lenses that may be used.

In order to make my invention comprehensive and to develop this in relation to binocular vision, I present a number of diagrams on which the mathematical formulas are developed. In these diagrams.

Figure 1:
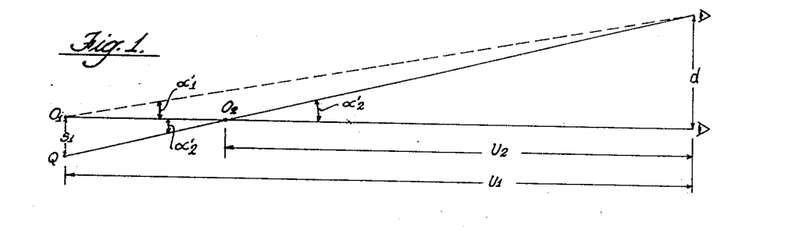
Fig. 1 illustrates binocular vision, in which two objects are in alignment with the left eye.

Referring to the diagram of Fig. 1, if the right eye is closed and the left eye left open, then $O_1$ and $O_2$ appear to be in line (no depth). Suppose the right eye is open and left eye closed, then in the plane of $O_1$ parallel to the eyes, the object $O_2$ is displaced from $O_1$ to Q. The amount of this displacement is a function of the actual depth or distance between the two objects (that is, distance $O_1$ and $O_2$). The $\alpha$'s (alphas) are the angles subtended by the interpupillary distance at the eyes by the objects $O_1$ and $O_2$. Let $U_2$ equal distance of $O_2$ from the eye and $U_1$ distance of $O_1$ from the eye, then $U_1-U_2$=actual separation of objects $$(O_1 O_2).\alpha_2' = \frac{d}{U_2}$$

(in radian measure; note that $d$ is so small compared with $U_2$ that $d$ can be taken as the arc)

the tangent of a small angle is equal to the angle measured in radians, therefore:

$$\alpha_2' = \frac{arc}{radius}$$

Then:

$$\tan \alpha_2' = \frac{O_1 Q}{O_1 O_2} = \frac{S_1}{O_1 O_2} = \frac{S_1}{U_1 - U_2}$$

But $$\tan \alpha_2' = \frac{d}{U_2}$$

Therefore, equate the two values of $\tan \alpha_2'$ (Interpupillary)

$$\frac{d}{U_2} = \frac{S_1}{U_1 - U_2}$$

(1) $$U_1 - U_2 = \frac{S_1 U_2}{d}$$

(2) $$S_1 = \frac{d(U_1 - U_2)}{U_2}$$

Equation (1) gives the actual separation of the objects $(U_1 - U_2)$ in terms of the displacement S. The displacement is thus seen to be proportional to the distance between the two objects. Equation (2) shows the amount of displacement as a function of the actual separation of the objects $O_1$ and $O_2$, and thus the amount of displacement necessary to give normal correct depth of perception.

Figure 2:
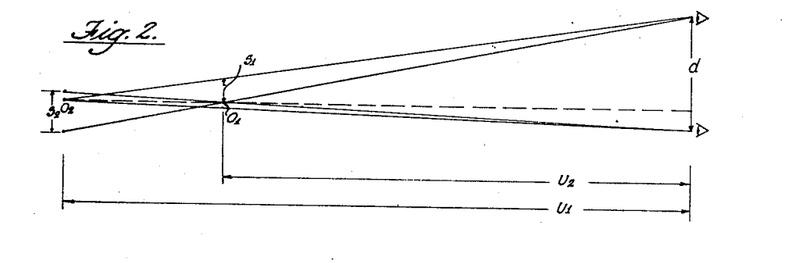
Fig. 2 illustrates another case of binocular vision in which the two objects are not in alignment with either eye.
Figure 3:
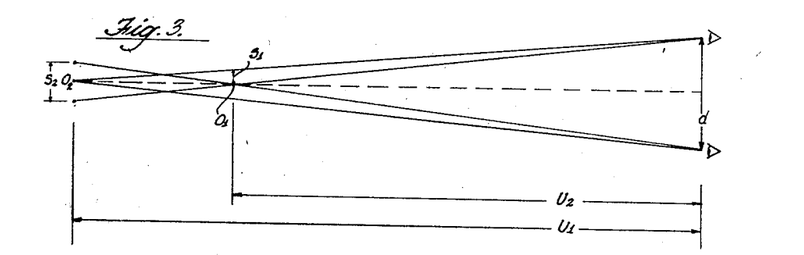
Fig. 3 is a diagram illustrating binocular vision, in which the two objects are aligned between the eyes.

In regard to Figs. 2 and 3, these illustrate action of eye in perceiving depth. The displacement distance equals $S_2$ in plane of $O_2$ for object $O_1$ when first one eye and then the other is open.

$$\frac{U_1}{d} = \frac{U_2 - U_1}{S_2}$$

(2') $$S_2 = \frac{d(U_2 - U_1)}{U_1}$$

Figure 4:
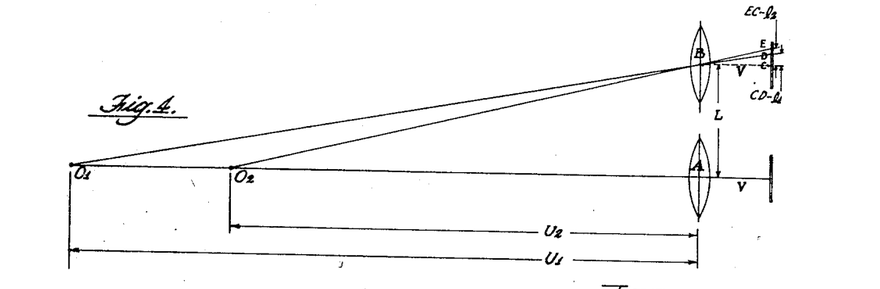
Fig. 4 is a diagram illustrating the action in a camera having the lens and film reciprocated in a straight line at right angles to the main axis of focus.

Referring next to Fig. 4, which gives the analysis of the camera when reciprocating at right angles to the axis of focus which may be done in accordance with my patent for Motion picture apparatus 1,850,615, dated March 22, 1932, or in accordance with my patent application for Cyclic oscillator, Serial No. 405,142, filed November 6, 1929, which has become forfeited, these cameras being used with straight guide tracks:

Let V=image distance=focal length of lens=$f$
Let U=object distance=distance from lens to object
Let L=amount of displacement from the original position
Let $l_2$=amount of displacement on film of image of object No. 2=$O_2$.
Let $l_1$=amount of displacement on film of image of object No. 1=$O_1$ $$\triangle O_2 AB \sim \triangle BCE$$

$$\frac{L}{U_2} = \frac{l_2}{V}$$

(3) $$l_2 = \frac{VL}{U_2}$$

In similar manner using $$\triangle O_1 AB \sim \triangle BCD$$

(4) $$l_1 = \frac{VL}{U_1}$$

$$l_2 - l_1 = \frac{VL}{U_2} - \frac{VL}{U_1}$$

or factoring (5) $$l_2 - l_1 = VL\left(\frac{1}{U_2} - \frac{1}{U_1}\right)$$

$$= VL\left(\frac{U_1 - U_2}{U_1 U_2}\right)$$

In actual practice the distance V is equal to $f$ (to a high degree of approximation) so that (5) can be written:

$$l_2 - l_1 = fL\left(\frac{U_1 - U_2}{U_1 U_2}\right)$$

We are interested in the relative displacement on the film of one object (e. g. $O_2$) to another object (e. g. $O_1$). This can be obtained by subtracting Equation (4) from Equation (3). Equation (5) shows the relationship between the relative displacements on the film $(l_2 - l_1)$ and the actual separation of the objects $O_1$ and $O_2$, which is $(U_1 - U_2)$, and the distances of the objects from the camera ($U_1$ and $U_2$). It is interesting to compare Formula (5) with Formula (2): one gives the relative displacement of the images of two objects on a film and the other gives the displacement of one object imaged in the plane of another object due to the action of both eyes. They are similar in that in both cases the displacement is a constant times the actual separation of the two objects. The denominators, however, are different. Therefore, when the film is projected on a screen, there will be relative displacements between the projected images of $O_1$ and $O_2$ which are proportional to $l_1 - l_2$. The eye will view these displacements as a certain $S_1$ which, according to Equation (2) will be interpreted by the eye as a corresponding separation of the objects $(U_1 - U_2)$ which will not, in general, be the same as the actual distance of separation of the original objects $(U_1 - U_2)$ of Equation (5). Thus, there will be certain distortion in the depth perception. This distortion is either anaglyphic (i. e. too pronounced a perception of depth) or pseudoglyphic (i. e. too little a perception of depth). This distortion does in no way alter transverse contours of objects photographed.

The control of this factor can be governed by relating Equations (2) and (5) with variable factor L so that, in practice, a cameraman may place his plane of "true vision" or true depth rendition in the photographic field where principal action is taking place and this will be made easy for him by properly graduating a drum on the mirror-spacing mechanism in terms of feet.

Figure 5:
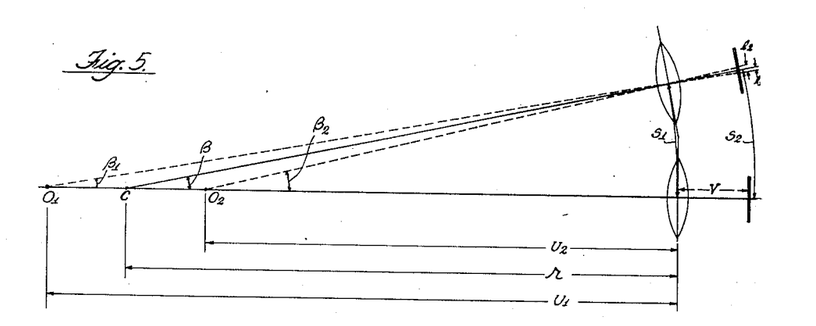
Fig. 5 is a diagram illustrating the action of a camera and film oscillated in an arc, of which the center object or the position between two objects forms the center of the radius.

Next referring to Fig. 5, which is used in an analysis of the action of the camera when oscillating on an arc which may be done in accordance with my patent for motion picture apparatus above designated, or in accordance with my patent application for cyclic oscillator above indicated when using curved guide tracks.

Let C=center of oscillation=center of curvature of arc of oscillation.
Let $r$=distance from center of oscillation to lens=radius of curvature of arc of oscillation.
$O_1$ and $O_2$=objects, as above.
$U_1$ and $U_2$=objects distances from lens, as above.
V=image distances from lens, as above=$f$.
$S_1$ and $S_2$=arcs described by the lens (center) and film (center), respectively.
In first position both $O_1$ and $O_2$ will be imaged at same point.
In second position:

(6) $$\beta = \frac{S_1}{r} = \frac{arc}{radius}$$

(7) $$\beta = \frac{S_2}{r + V}$$

(8) $$\beta_2 = \frac{S_1}{U_2}$$

$$(9) \quad \beta_2 = \frac{S_2 + l_2}{U_2 + V}$$

$$(10) \quad \beta_1 = \frac{S_1}{U_1}$$

$$(11) \quad \beta_1 = \frac{S_2 - l_1}{U_1 + V}$$

From (9) we have: $S_2 + l_2 = (V + U_2)\beta_2$ substitute from (8) for $\beta_2$ $$S_2 + l_2 = (V + U_2)\frac{S_1}{U_2}$$

$$(12) \quad l_2 = (V + U_2)\frac{S_1}{U_2} - S_2$$

From (11):
$$S_2 - l_1 = \beta_1(U_1 + V)$$

Substitute for $\beta_1$ from (10)
$$S_2 - l_1 = \frac{S_1}{U_1}(U_1 + V)$$

$$(13) \quad l_1 = S_2 - \frac{S_1}{U_1}(U_1 + V)$$

Equate (6) and (7)
$$\frac{S_1}{r} = \frac{S_2}{r + V}$$

$$(14) \quad S_2 = \frac{S_1(r + V)}{r}$$

Substitute in (13) for $S_2$ $$l_1 = \frac{S_1(r + V)}{r} - \frac{S_1}{U_1}(U_1 + V)$$

$$= \frac{S_1 r + S_1 V}{r} - \frac{S_1 U_1 + S_1 V}{U_1}$$

$$(15) \quad = \frac{S_1 U_1 r + S_1 U_1 V - S_1 U_1 r - S_1 V r}{U_1 r} = \frac{S_1 V(U_1 - r)}{U_1 r}$$

Substitute in (12) value of $S_2$ from (14).

$$l_2 = (V + U_2)\frac{S_1}{U_2} - \frac{S_1(r + V)}{r}$$

$$= \frac{VS_1 + U_2 S_1}{U_2} - \frac{S_1 r + S_1 V}{r}$$

$$= \frac{V r S_1 + U_2 r S_1 - U_2 r S_1 - U_2 V S_1}{U_2 r}$$

$$= \frac{V r S_1 - U_2 V S_1}{U_2 r}$$

$$(16) \quad = \frac{V S_1(r - U_2)}{U_2 r}$$

Relative displacement of images of $O_1$ and $O_2$ $= l_1 + l_2$   Add Equations (15) and (16)

$$l_1 + l_2 = \frac{S_1 V(U_1 - r)}{U_1 r} + \frac{S_1 V(r - U_2)}{U_2 r}$$

$$= \frac{S_1 V U_1 - S_1 V r}{U_1 r} + \frac{S_1 V r - S_1 V U_2}{U_2 r}$$

$$= \frac{S_1 V U_1 U_2 - S_1 V r U_2 + S_1 V r U_1 - S_1 V U_2 U_1}{U_1 U_2 r}$$

$$(17) \quad l_1 + l_2 = \frac{S_1 U_1 V r - S_1 U_2 V r}{U_1 U_2 r}$$

$$= \frac{S_1 V(U_1 - U_2)}{U_1 U_2}$$

Compare with Formula No. (5).

The only difference in the two formulas is that $S_1$ replaces L in Formula (5). They are similar quantities, however, and as the motion along the arc is the same (numerically) as the straight line motion L in (5) the relative displacements on the film in the two cases will be the same. However, the real difference in the two cases is in the actual objects which remain fixed (undisplaced on the film). In the oscillating arc case, an object at C would remain undisplaced and, therefore, objects at this point may be considered to act as reference objects with respect to which the eye determines the depth of other objects. In the case of oscillation along the straight line, the objects which would remain undisplaced would be those at infinity and, therefore, these would act as reference points with respect to which the eye determines the depth of other objects.

The mathematical solution using the rotating segmental mirrors is founded on Figs. 6 and 7, and is as follows:

Let A and B represent two adjacent mirror planes.
Let $b$ = distance of separation of mirrors.
Let O be an object.
Let $l$ = displacement on film due to the two pseudo objects O' and O'''.
Let V = image distance = $f$ (very approximately).

(18)   Let $\alpha$ = (in radian measure)

$$\frac{1}{V} = \frac{1}{f}$$

Let $a$ = distance from object to mirror.
Let $c$ = distance from mirror to lens.

(18')   $a + c$ = Total object distance from lens = U.
OD = $a$ = DO'

$$(19) \quad \alpha = \frac{O'O'''}{a + c}$$

(In radian measure) (angles $\alpha$ are very small so that arc = chord)

Let DE = X
Angle DEF = $\theta$
But EF = $b$ $$DE = \frac{b}{\cos \theta}$$

Distance from object to second mirror
$$= a + DE = a + \frac{b}{\cos \theta}$$

(20)   AO = AO'
(21)   OB = OA + AB
(22)   OA + AB = OA + $b$
(23)   OB = OA + $b$
(24)   OB = BO''
(25)   BO'' = OA + $b$
(26)   BO'' = BO' + O'O''   Substitute in (26) value of BO'' from (25)
(27)   OA + $b$ = BO' + O'O''   From (20) substitute.
(28)   O'A + $b$ = BO' + O'O''
But   BO' = AO' − $b$   Substitute in (28)
(29)   OA' + $b$ = AO' − $b$ + O'O''
(30)   O'O'' = 2$b$ As far as the displacement on the film is concerned, object O'' is equivalent to object O'''. Consider two pseudo objects O' and O'''.

Let $\beta$ = complement of angle $\theta$ = 90° − $\theta$
O'O''' = O'O'' cos $\beta$   But O'O'' = 2$b$ from (30)

(31)   O'O''' = 2$b$ cos $\beta$   From (18) and (19)
$l = f\alpha$ $$(32) \quad = f\frac{O'O'''}{a + c}$$

Substitute (31) in (32)

$$(33) \quad l = f\frac{2b \cos \beta}{(a + c)}$$

or from (18')

$$(34) \quad l = f\frac{2b \cos \beta}{U}$$

formula for displacement on film of image of an object at a distance U from the lens in terms of the mirror separation $b$, focal length of lens and angle at which light strikes mirror.

Consider two objects, one at distance $U_1$ and other at a distance $U_2$ and apply Formula (34) to both.

(34') $$l_1 = f \frac{2b \cos \beta}{U_1}$$

To get relative displacement of images on screen, subtract (34') from (34'')

(34'') $$l_2 = f \frac{2b \cos \beta}{U_2}$$

$$(l_2 - l_1) = f\left(\frac{2b \cos \beta}{U_2}\right) - f\left(\frac{2b \cos \beta}{U_1}\right)$$

$$= 2fb \cos \beta \left(\frac{1}{U_2} - \frac{1}{U_1}\right)$$

(35) $$= 2fb \cos \beta \left(\frac{U_1 - U_2}{U_2 U_1}\right)$$

This equation can be compared with Equation (5) and Equation (17) of the other methods.

In this Equation (35) two factors are at disposal of operator, viz., $b$ and $\beta$ to control relative separation of images on film, $\beta$ controlling the angle the mirrors make with optical axis of the lens.

Let No. panels per second $= n$
Let No. sectors of the mirror disc for each panel $= 1$ (one)
Let No. sectors of mirror disc passing in front of camera lens each second $= n$
Let No. sectors in mirror disk $= S$ R. P. S. of mirror disc $= \frac{n}{S}$ Let $t =$ reaction time for fusion of image for average eye $= \frac{1}{12}$ second.

Let $N =$ R. P. S. of disc $= \frac{n}{S}$ (35') $SN = n$

Let $\tau =$ time 1 sector is acting on film (assuming maximum time of exposure on each panel)

(36) $$\tau = \frac{1}{n} = \text{reciprocal of } n$$

Let $R =$ No. panels passing during fusion time of eye.

(37) $R = \frac{t}{\tau}$  But from (36)

$R = tn$  But using (35)

(38) $R = tSN$

Effective displacement of images for depth of focus $= G$ (39) $G = (l_1 - l_2)R$  Substitute from (35) and (38)

(40) $$G = 2bf \cos \beta \left(\frac{U_1 - U_2}{U_1 U_2}\right) NSt$$

Then solving for $b$ (41) $$b = \left(\frac{U_1 U_2}{U_1 - U_2}\right)\left(\frac{G}{2fNSt \cos \beta}\right)$$

In regard to Formulas 39 and 40, one can assume certain values as, in standard practice, the film moves at the rate of twenty-four panels per second. The mirror disk is formed with four segments and as each segment must reflect light on to a single panel, therefore, the mirror disk must rotate six revolutions per second. It is desirable to have the angle of incidence of the light from the objects on the mirror disk always forty-five degrees, therefore this being a constant. Therefore:

Let $\beta = 45°$
Cos $\beta = 0.707$
Suppose $S = 4$
Suppose $t = \frac{1}{12}$ second
Suppose $N = 6$
Suppose $b = \frac{1}{16}$ inch
Suppose $f = 50$ mm.
    $= 1.969$ in.
Suppose $U_1 = 10' = 10 \times 12$ in.
Suppose $U_2 = 30' = 30 \times 12$ in.

Then $$G = \frac{1.414(6)(4)(1.969)}{12 \times 16}\left(\frac{360 - 120}{360 \times 120}\right)$$

$$= \frac{1.414 \times 6 \times 4 \times 1.969 \times 240}{12 \times 16 \times 360 \times 120}$$

$= .00193$ in. displacement per two panels.

An example of Equation (2) for the eyes
Assume $U_2 = 10' = 10 \times 12$ in.
Assume $U_1 = 30' = 30 \times 12$ in.
Assume $d = 2.5$ in.

$$S_1 = \frac{2.5(30 \times 12 - 10 \times 12)}{10 \times 12} = \frac{2.5(360 - 120)}{120} =$$
$$2.5(2) = 5 \text{ in.}$$

An example of Equation (5) for rectilineally oscillating camera:
Assume same $U$'s as above.
Assume $V = 1.969$ in.
Assume $L = \frac{1}{20}$ in.

$$l_2 - l_1 = \left(\frac{1.969}{20}\right)\left(\frac{240}{43200}\right) = .0000546 \text{ in.}$$

In Equation (17) for an arcuately oscillating camera:
Assume $S_1 = \frac{1}{20}$ in.

$$l_1 + l_2 = \frac{1.969}{20}\left(\frac{240}{43200}\right) = .000055 \text{ in.}$$

It will be seen that the displacement values solved as above in regard to Equations (5) and (17) are extraordinarily small for the displacement of the lens of one-twentieth inch between successive panels, but where the whole camera or the camera lens and film is oscillated in accordance with my patent and patent application above mentioned, a number of pictures are taken of the successive images on opposite sides of the central or median line of the film. The displacement on the film may be increased by increasing the distance L, which is the movement of the lens, for each successive panel of the picture. As the value L may be a variable, it may be solved as follows: (from Equation (5), referring to Figs. 4 and 5).

$$L = \frac{(l_1 - l_2)(U_1 U_2)}{V(U_1 - U_2)}$$

In this solution, a value must be given for the specific displacement of images on the film which it is desired to have. There are limitations to the degree or extent of oscillation of the camera or camera lenses due to the time factor, as when the distance of movement becomes too great, the vibration becomes excessive.

In the above mentioned formulas, the lenses have been treated as simple lenses, for purposes of illustration, but to be absolutely exact, the distances should be measured from the nodal point of one lens of a composite lens to the object and from the nodal point of the other lens to the film to obtain the measurements U and V, respectively.

Reverting to the equations, it will be noted in connection with Equation (5) and Fig. 4 that this interprets the displacement of the images of a near and a distant object which, in one position, are in median line with the camera lens and, in another position, are out of alignment. The displacement indicates the distance the images are apart from each other in the panels in which they are offset from the median line. The Equations (3) and (4) indicate the displacement of each single image from the median line. Equation (17) has similar characteristics to Equation (5) and is founded on Fig. 5. In this case the distance apart of the spaced images is the sum of their individual displacement from the median line. In regard to the procedure using the segmental mirrors from the diagrams of Figs. 6 and 7, the image displacement of a single object when the light is reflected by two successive mirror segments is given by Equation (34), this being the displacement from what might be termed the median line. Equation (35) interprets the image displacement of a near and a distant object which are in a median line on one panel of a film and offset therefrom on a second panel due to reflection from a second mirror segment. Equation (40) interprets the function of Equation (35) when the time element enters in the rotation of the mirror segments and the time of fusion of images by the eye.

Figures 6, 7:
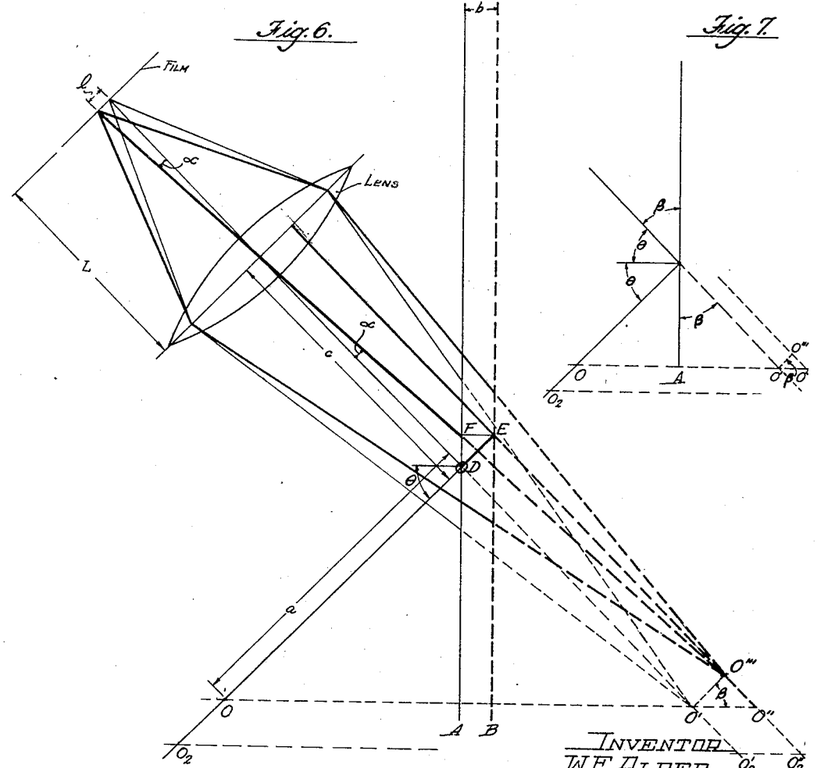
Fig. 6 is a diagram showing the system of displacement of images by rotating segmental mirrors.
Fig. 7 is a diagram showing certain of the angles of Fig. 6.

In Figs. 6 and 7, the objects O and $O_2$ may be considered on a median line when the reflection is from the first mirror A. The virtual images of $O_2$ will then be at $O_2'$ when the reflection is from the mirror A and from $O_2''$ when the reflection is from the mirror B. The relative displacement of the images of the two objects O and $O_2$ may be derived from Equations (34') (34''), the solution being given in Equation (35).

In Equations (3) and (4) the actual displacement $l_1$ and $l_2$ on the film from the median line of Fig. 4 determines when the two panels are projected in sequence, the actual positions in the space at which the images $O_1$, $O_2$ would be positioned by the brain of the spectator. A single object projected on a screen may be definitely fixed in space by its apparent distance from the observer, who, in viewing a motion picture, unconsciously places the point of visual fixation at a place behind the screen and the unconscious reaction of the observer is aided by the sub-conscious realization that the screen constitutes a definite plane of reference as regards distance from the observer. Therefore, the displacement of a single object on successive panels from the other in accordance with Equations (3) and (4) will give the effect of the object being positioned in space when the pictures are successively projected on the screen.

Figure 11:
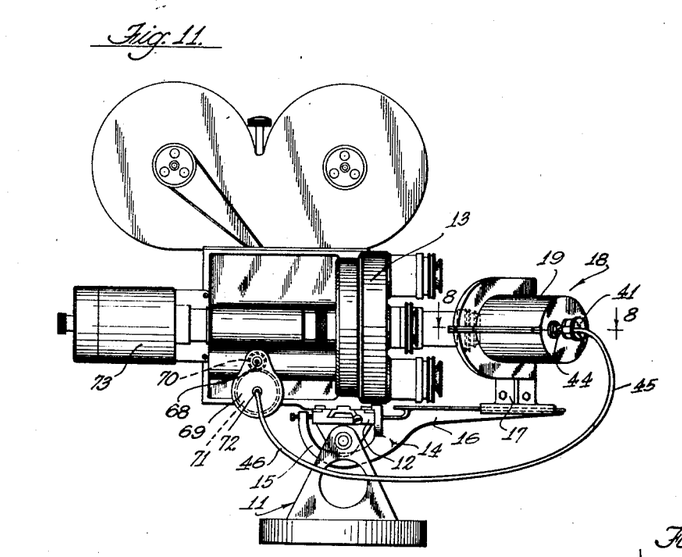
Fig. 11 is an elevation showing the manner of setting up the rotating segmental mirrors with the camera and the synchronized drive.

Referring to Figs. 8 through 11, I illustrate in Fig. 11 a tripod head 11. This is of standard construction and has a transverse track 12, on which the camera 13 is slidably mounted. Connected to this track I have a bracket structure 14 which is shown as having a clamping yoke 15 engageable underneath and around the track, and a supporting arm 16. The camera may be shifted laterally on the track 12 in the usual manner.

On the arm 16 I employ a slidable carriage 17, which carriage forms a mounting for the housing structure 18, in which the rotatable mirrors are enclosed. This housing structure has a cylindrical section 19, an enlarged end structure 20, a side structure 21 for the reflection of light. Through this side structure there is a window 22 which receives the incident light from an object, and on the opposite side there is a second window 23, through which is projected the reflected light to the camera. The housing is formed air and dust tight so that the mirrors will not be affected by dust or moisture.

In the cylindrical housing structure 18 I employ a pair of fixed bearing structures 24 and 25, these being adjacent opposite ends, and in these bearing structures there is a ball bearing 26. A main mirror shaft 27 extends through these bearings and has a segmental mirror 28 secured to its outer end. A sleeve 29 is keyed to the shaft and has a double segmental mirror 30 thereon. The two segments of the mirror 30 are in the same plane. A second outside sleeve 31 is keyed on the inner sleeve 29 and has a segmental mirror 32. This mirror is diametrically opposite the mirror 28, the mirrors being spaced axially of the shaft 27 in reference one to the other.

A pair of guide rods 33 are secured in the bearing structures 24 and 25 and on these are two slidable yokes 34 and 35, each yoke having an anti-friction bearing 36. The yoke 34 is secured to the outer sleeve 31 and the second yoke 35 to the inner sleeve 29 so that when such yokes are moved the sleeves and, hence, the segmental mirrors attached thereto, will be moved longitudinally of the shaft 27.

A screw 37 is used to move the yokes and, hence, the mirrors. This screw has a relatively fine pitch thread 38 and a thread of twice the coarseness 39. I find it convenient to make the threads 38 of forty to an inch and the threads 39 of twenty to an inch. The threaded parts of the screw are threaded in the yokes 34 and 35. The end of the screw has a micrometer head 40 which has fine graduations 41 which may be in ten thousandths of an inch. These are readable against stationary graduations 42 on a boss 43. To make the mirror box dust and moisture proof at the shaft 27, I make provision for a packing with a packing gland 44. The end 45 of the shaft is illustrated square and has a flexible drive shaft 46, this being shown as connected thereto by a set screw 47', this giving the drive for the mirror shaft.

In order that I may obtain an accurate reflection, I employ an adjustable mirror 47. This is illustrated as having a backing plate 48, such plate having a series of studs 49 thereon, the studs each extending through a tubular boss 50. A head 51 is threaded on each boss and through each head extends an adjusting screw 52, each screw being threaded in a stud 49, and there being a compression spring 53 bearing against a cap and a stud.

There are three of the bosses and studs, and the studs have a sufficiently loose fit so that a three-point adjustment may be made to secure the proper reflection by the mirror 47. The bracket structure 14 is illustrated as having an elongated guide and supporting flange 54 to engage on part of the track 12. In order that the mirror housing may be assembled and disassembled, this is split through the center and has flanges 55 which may be bolted together.

The path of incident ray of light is indicated at 56, the light proceeding in the direction of the arrow 57. This is reflected at 58 by the mirror 47, and the reflected incident ray 59 strikes any one of the four segmental mirrors illustrated.

Figures 8, 9:
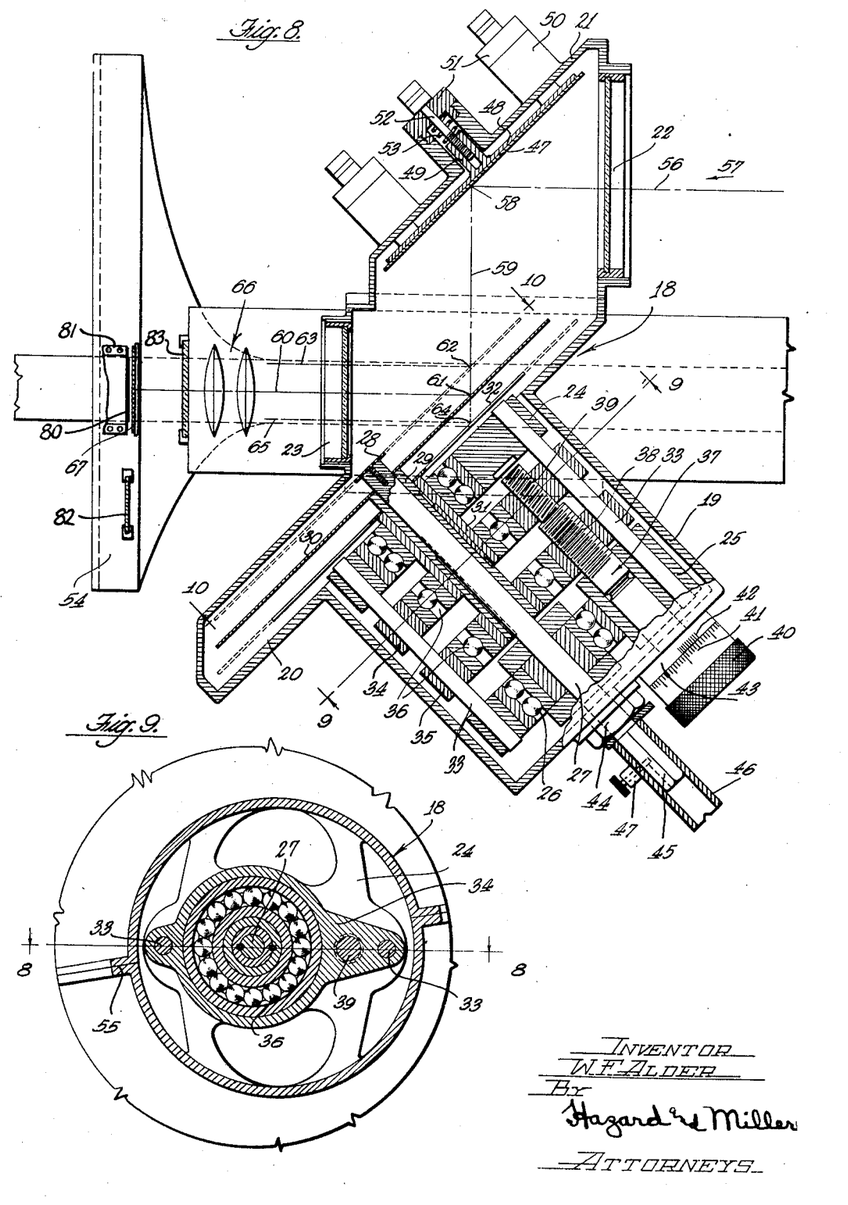
Fig. 8 is a section through a segmental mirror device for reflecting light from the mirrors, taken substantially on the line 8—8 of Figs. 9, 10 and 11 in the direction of the arrows indicating portions of the camera and its optical system in diagram.
Fig. 9 is a transverse section on the line 9—9 of Fig. 8 in the direction of the arrows.
Figure 10:
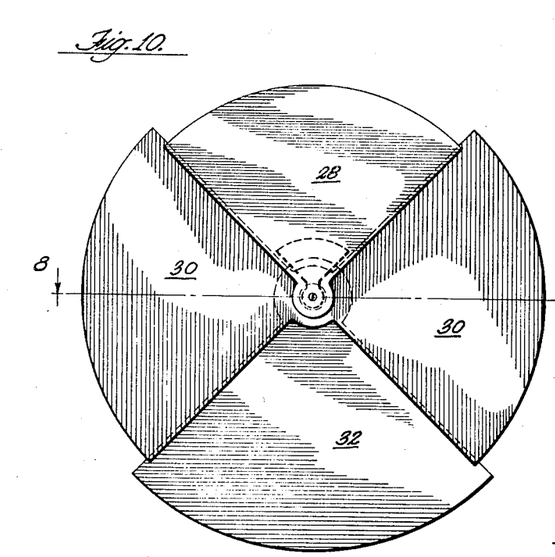
Fig. 10 is an elevation of rotatable segmental mirrors and may be considered as taken on the section line 10—10 of Fig. 8 in the direction of the arrows.

The illustration of Fig. 8 shows the center mirrors 30 in section and of the full diameter. The outer mirror 28 has its plane of rotation illustrated dotted. The mirror 32 is illustrated partly in section and partly in elevation with a dotted extension to show the plane of rotation. In Fig. 8 the resultant incident ray is indicated at 60, being reflected off the mirror 30 at 61. When the ray 59 strikes the outer mirror 28, it is reflected from a point 62 along the resultant path 63. When the ray 59 is reflected from the innermost mirror 32, it is reflected from the point 64 along the resultant path 65. It will thus be seen that the resultant incident rays reflected by the stationary mirrors 47 and by the rotating mirrors have the axis of the object reflected in lines spaced laterally one from the other. Therefore, when an image is formed by an optical system 66 of a camera and such image is on a film 67, the image will be laterally displaced on the film for each segment of the mirrors. The movement of the film, the camera shutter, and the segmental disk mirrors is so timed that when the film is stationary and exposed by its shutter, one segment only will reflect light on to a single panel. Then, when the next panel is exposed, the next segment reflects the light, etc. This forms a series of images alternating to one side and the other of a center image. The center image may be considered as formed by the center mirror when three mirrors are used. It is to be understood, however, that, if desired, only two segmental mirrors could be used, or more than three if found desirable.

Referring to the set-up of the camera and the light reflecting mirrors of Fig. 11, the turret of the camera may be rotated for focusing and the focused light passed through the mirror instrument. This allows focusing on the scene with the mirrors in the same position as when the camera is shifted for taking a picture through the same lens. The mirror housing, as above mentioned, may be shifted longitudinally on the arm 16 so that the end of the lens tube may fit snugly in the window housing 23, or if the lens tube is too short, a light-obscuring sleeve may be slipped over this.

In order to obtain a synchronous drive between the camera mechanism and the mirrors, I make use of the standard hand crank 68 of the camera and install a gear housing 69 surrounding this shaft. This has a gear train therein in which the gear 70 is indicated as secured to the shaft 68, and a large gear 71 to a shaft 72. This shaft 72 has the flexible shaft 46 connected thereto. The hand crank may be placed on the end of the shaft 69, if desired, but the standard motor drive 73 is used for operating the camera when taking pictures. The hand crank is used in focusing. As above described, the standard cameras have the intermittent film movement mechanism and the shutter synchronized to open the lens at the period of time when the film is stationary, and during this time period one of the segments of the mirror is in a position to reflect light on to the film, that is, on to one panel of the film. When the film moves, it is obscured by the shutter and at this time the meeting or overlapping edges of the segments in a next adjacent plane pass by the lens and another mirror segment is in a position to reflect the light at the next stoppage of the film. As above mentioned, the hand crank may be utilized, which will operate the shutter while a focus is being made of the scene to be photographed.

The focusing may be on a ground glass or may be an aerial image, but in either case it is desirable to have vertical graduating lines, either on the ground glass or formed by a grid of cross hairs so that the lateral movement of the image in the focusing finder may be readily ascertained and inspected by the cameraman.

In order to have the lateral displacement of successive images correct in accordance with the distance of objects and the other constants and variables in accordance with Formulas (40) and (41) above, it is necessary that the mirrors be adjusted the correct distance apart. The micrometer head 40 is so graduated that the cameraman may mathematically work out the Formula (41) to secure the value of $b$, which is the space apart of the mirror segments, and may then set the micrometer head accordingly, or, in order to save time, a table may be prepared having the result or solution of a large number of common variables, such as of scenes photographed at different distances from the camera, etc. This table or chart, upon inspection, shows the setting to be given the micrometer head 40.

Another manner of quickly arriving at a solution of Formula (41) is to use a specially designed slide rule, which, having known constants and used with certain variables, may be manipulated to quickly ascertain the value of $b$. Therefore, by my invention, a correct spacing of the mirror segments is possible in accordance with the mathematical determination of the displacement of the images laterally on the film for successive frames.

In practice, it has been found when using this apparatus that the setting of mirror-spacing distance $b$ may be made within the limits of commercial accuracies without recourse to solving the value $b$ mathematically, by the cameraman's careful scrutiny of the successive reflected images appearing on the ground glass of his camera and noting that reading of the micrometer head which occurs at the instant the images on his ground glass are in exact synchrony in all planes with each other as regards their lateral reciprocating motion. When observing such a series of successive images as is caused by the rotation of the mirrors, the whole picture, apparently, moves from right to left and left to right in rapidly recurrent cycles. When the mirror spacing $b$ is in correct relation to the distance of the foreground objects and other objects which constitute the view being photographed, there is no apparent weaving back and forth across the field of any one object constituting the view in relation to another. When the mirror spacing $b$ is not correctly set, (and this is always a function of the distance of the prime plane or most important plane of the action) from the camera, there will be an apparent weaving, as above noted.

The mathematical formula is the sure way of setting this distance $b$ inasmuch as, in practice, the ground glass of a motion picture camera has an area of approximately three-quarters square inch, (the same as one panel of the film) and while this is, apparently, enlarged with a small magnifier through which the ground glass is scrutinized, it is difficult and requires meticulous care on the part of the operator to discern minute relative displacements of objects.

One of the important points in this invention, and it should be within the purpose of intent of the specification and claims, is to set forth the incorporation of a set of hair-like vertical reference lines on the ground glass of the view finder in the camera, the lines thereon being engraved in relation to the quantity G on the basis of the spacing of two suitable objects O' and O'' set at approximate distances of ten and thirty feet, relatively, from the camera as being those approximate distances which furnish a reference datum common to the average depth of focus required in ordinary studio practice.

Figure 12:
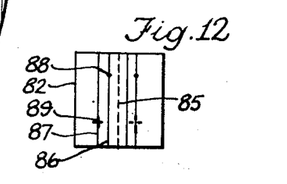
Fig. 12 is an elevation showing in diagram an observation screen used for focusing.

In Figure 12 I illustrate in elevation a focusing screen 82 which may be of ground glass. On this screen there is illustrated a central or median line 85, and on each side thereof there are found hair-like lines 86 and 87, these being vertical. When using the focusing screen, the objects being focused on one side of the median line, the remote object indicated by the dot 88, would be approximately on the line 86, and the image of the near object 89 would be approximately on the line 87, these lines 86 and 87 being apart a suitable distance to designate the quantity G. When these images are on the opposite sides of the median line 85 they will be indicated in opposite positions as shown in Figure 12.

All camera practice becomes, sooner or later, a matter of skilled technique on the part of the operator, and experience with the apparatus built prior to the filing of this application has demonstrated that with increased familiarity, both as regards manual technique and optical discernment, I have been able to disregard the solving for G and have been able to so set the micrometer for distance $b$ as to eliminate any apparent motion on the viewing screen of the theatre, due to the displacement G on the ground glass or the film. For those cameras which are commonly supplied with an optical image viewing device in which a ground glass is not incorporated, the hair line spacing grid will be supplied in a form similar to the small eye piece micrometer disks commonly used in microscopes, this being set at the proper focal plane between the lenses of the eye piece so that its image is superposed upon the image of the scene to be photographed.

The factor G represents lateral image displacement as regards individual successive panels. It is this quantity or the magnitude of this displacement that controls the amount of apparent depth obtained in the resulting picture. An analysis was made of normal eye action and a formula adduced for the determination by mathematical means of a quantity $S_1$ (of Formula No. 2), gives the amount of displacement of the actual separation of objects $O_1$ and $O_2$, and by the same token, the amount of displacement necessary to give normal correct depth perception. By inspection of this formula and the succeeding mathematical analysis obtained herewith, it becomes apparent that if the quantity $b$ be greater or less than a given amount, as arbitrarily designated by the solving of the two final formulas, there will be, between the extreme foreground of the picture and the plane of true normal vision therein depicted, a series of planes infinite in number, in which depth perception becomes anaglyphic, and by the same token, between the plane of true vision and the background objects in the picture, there will be an infinite number of planes which become progressively pseudoglyphic as regards recession from the true plane toward the background. It is common practice in all theatrical performances and, in fact, all representations of any nature which are intended to appeal to the artistic and aesthetic senses may at times, for the purpose of accentuation, be overdrawn and enhanced. This is extremely effective in many of the arts and no less in the presentation of motion pictures. It, therefore, lies within the range of camera technique to which this method of photography is applied to bring out or accentuate certain planes in the picture to give greater relief than the eye would normally discern and thus subordinate all other planes in the picture to that one upon which the director and cameraman may desire to focus a spectator's attention. Thus, by the utilization of the formula for the solving of G, as attached hereto, the cameraman may so set his micrometer head that a plane of anaglyphic rendition may coincide with the position or positions of certain objects or actors, and subordinate a certain plane to the point of normal vision at a greater or less distance lying behind toward the background of that plane in which the principal action is to be made anaglyphic within more or less wide limits. The amount of this accentuation is within the control of the camera operator and may even be carried to the point of grotesquery if he so desires.

Past experience has taught me that growing familiarity in the use of the apparatus has developed similar automatic technique in the use of and mental determination of what the quantity G (effective displacement of images (Formulas (39) and (40)), should be. This becomes an automatic function quite the same as does the non-volitional setting of photographic exposure by means of the iris diaphragm in the lens by any cameraman skilled in his art.

An important feature of my invention relates to the device and the method of relatively spacing the rotating mirrors to obtain a relatively lateral displacement of a so-called near and distant object on successive panels of the motion picture film. Where I use the term "near and distant objects" these may be points or localities on a single object which are at different distances from the camera, and it is not necessary that they be in alignment on one of the panels of the photograph or when viewed optically. The near and distant objects can better be considered as relatively near and distant points to be photographed. The main feature, therefore, of my invention, is that a means and method is provided for obtaining the correct lateral displacement of these near and distant points on the series of panels so that when the picture is projected in an ordinary moving picture projector, the effect of depth or stereoscopic vision is obtained.

The camera man or operator may shift the turret of the camera in order to focus by observation the scene to be photographed. He may have the mirrors rotating and may adjust the micrometer head 40 until he obtains a desirable lateral shift of the images without the apparent back and forth weaving of the near and distant points relative one to the other. This is only of use where the near and distant points are relatively stationary as regards the camera. He cannot, with a single set of rotating mirrors, visually observe the lateral oscillation of the image and the weaving of the near and distant points while he is taking a photograph. Therefore, should the near and distant points be moving relative to each other or to the camera, as for instance when perambulator shots are made, as, for instance from a long shot to a close-up or vice versa, it is necessary for the operator to adjust the micrometer head 40 while these changes are being made in the relative distances of the so-called near and distance points and the camera. As above mentioned, he can calculate the value of $b$ of Formula 40, or by consulting a table or chart. As stated above, he can adjust the micrometer head 40 while changes of distance are being made or by use of a special slide rule he could make quick calculations.

However, should it be found impractical on account of the time required to make the calculations or consult the table, the operator could, by use of the finder and focusing means of the camera prior to photographing, obtain the adjustment of the micrometer head 40 for the scene or objects at various distances from the camera by either making a written or mental note of these and while the actual picture is being taken, he can adjust the micrometer head and obtain satisfactory results.

In Fig. 8 I illustrate in diagram the optical system of a camera in which the numeral 66 designates a lens assembly, 67 indicates a film, this having a support 80 with an intermittent feed 81. An observation screen 82, such as ground glass or the like, used for focusing, is indicated at one side of the film. The usual type of shutter indicated in diagram at 83 is also used. These parts are standard equipment in cameras, and the camera body is shifted laterally on a support so that the lens system mounted on a turret and when rotated comes into optical alignment either with the film or the focusing screen.

Figure 13:
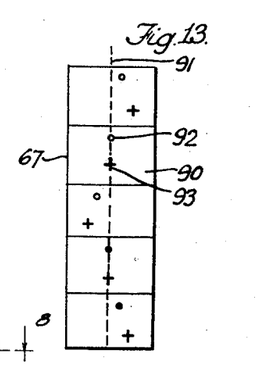
Fig. 13 is an elevation of part of the film, the marginal perforations being omitted, indicating the relative displacement of images.

In Fig. 13 is illustrated in diagram a portion of a film 67, this being separated into a series of panels 90. The median center line is indicated by the fine, dotted line 91, but manifestly this does not appear on the film itself. The image of a remote object is indicated by the numeral 92 and the image of a near object by 93, and when these objects are in alignment with the median line of the film they are photographed on such median line. However, when in photography the images are displaced to the right and left of the median line they would occupy the relative positions indicated on the film, offset or displaced one relative to the other. It will be noted that the remote object in the panels in which both images are displaced is nearer to the median line than the image of the near object.

Various changes may be made in the details of construction without departing from the spirit or scope of the invention as defined by the appended claims.

I claim:

1. An apparatus for making motion pictures comprising, in combination, a supporting structure adapted for connection to a camera mounting, a housing on said structure having a rotatable shaft, a plurality of mirror segments mounted on said shaft, each segment rotating in a different plane from that of the next adjacent segment, means to adjust the spacing between the segments considered longitudinally of the shaft to maintain the same spacing between adjacent segments, means to direct an incident ray of light from objects to be photographed on the mirrors when in one position during their rotation, said camera mounting being adapted to position a camera to receive the reflected light from the mirror segments, and means adapted for synchronizing the rotation of the shaft with the movement of the film and shutter of the camera.

2. In an apparatus for making motion pictures, a supporting structure having a rotatable shaft with a mirror segment thereon, a plurality of sleeves slidably mounted on the shaft and having means to rotate the sleeves with the shaft, each sleeve having one or more mirror segments thereon, said segments being positioned longitudinally of the shaft and circumferentially thereof to form complete reflecting surfaces when rotated, said segments being in parallel planes at right angles to the axis of the shaft, means to rotate the shaft, means to simultaneously move the sleeves to adjust the space between adjacent segments considered longitudinally of the shaft, said space being the same at any adjustment for adjacent segments, and means to mount the mirror segments to reflect an incident ray of light to a moving picture camera.

3. In an apparatus as claimed in claim 2, means to mount the supporting structure contiguous to a camera to secure the desired reflection of light to such camera, and means to synchronize the operation of the film and shutter of the camera with the rotating shaft to reflect light from each segment in succession to form successive images on the film during the periods the film is stationary and the shutter open.

4. In an apparatus as claimed in claim 2, said supporting structure having the shaft and mirrors mounted in a housing, said housing having a pair of windows one for incident and the other for reflected light, and a reflector to receive the incident light and to reflect such light to the mirror segments, said housing being air and dust tight.

5. In the method of making motion pictures with light reflected on a film by segmental mirrors rotating in parallel planes in which a first set of images is formed in a median line through the lens when in focal alignment with the axis of the lens and when reflected by one mirror segment on one panel of the film, and in which a second set of images is formed of the distant and near objects on a second panel of the film by light reflected from a second mirror segment, regulating the lateral displacement one from the other of the two second images of the distant and near object on the same panel, the displacement regulation being governed by the formula $$G = 2bf \cos \beta \left(\frac{U_1 - U_2}{U_1 U_2}\right) NSt$$

in which G is the lateral displacement of the two second images of the distant and near objects, $b$ is the distance apart of the mirror segments, $f$ is the focal length of the camera lens, $\beta$ the angle of incidence of light on the mirror segments when the distant and near objects are in alignment with the focal axis of the lens, $U_1$ the distance of a distant object to the mirror segment reflecting the objects on a median line and from the mirror segment to the lens, and $U_2$ the distance of a near object to the mirror segment reflecting the objects on a median line and from the mirror segment to the lens, N the revolutions per second of the mirror segments, S the number of segments to form a complete circle, and $t$ the reaction time for the fusion of images for the average eye.

6. An apparatus for making motion pictures comprising, in combination, a plurality of segmental mirrors, each segment being positioned in a plane parallel to the adjacent segment and spaced axially therefrom, means to rotate the segments as a unit, means to direct a beam of light from objects to be photographed to the segmental rotating mirrors and from the mirrors through a lens to a moving picture film in a camera, means to adjust the spacing axially of the mirror segments to obtain an equal spacing of all the segments, each segment from the adjacent segment, and graduations to indicate the spacing of the mirror segments, said graduations being in accordance with the formula $$b = \left(\frac{U_1 U_2}{U_1 - U_2}\right)\left(\frac{G}{2FNSt \cos \beta}\right)$$

in which $b$ is the distance apart of the mirror segments considered axially, $U_1$ is the distance between a distant object and one of the mirror segments and the lens, and $U_2$ is the distance between a near object, the same mirror segment, and the lens, the distances $U_1$ and $U_2$ being measured when the two objects are in a median line of light to the lens, G is the displacement of the two images on any panel other than the panel having the images in the median line, N the revolutions per second of the mirror segments, S the number of segments to form a complete circle, $t$ the reaction time for fusion of images for the average eye and $\beta$ being the angle of incidence of light on the mirror segments when the distant and near objects are in a medium line of light to the lens.

7. A motion picture film having a series of film panels, each with picture images thereon, certain panels having images of a distant and a near object in alignment on a median line of the panel, the images of the two objects on other panels being displaced from the median line and from each other, and the displacement of the two images one from the other considered laterally being in accordance with the equation $$G = 2bf \cos \beta \left(\frac{U_1 - U_2}{U_1 U_2}\right) NSt$$

in which G is the lateral displacement of the two second images of the distant and near objects, $b$ is the distance apart of the mirror segments arranged axially used to reflect the light for taking the picture, $f$ is the focal length of the camera lens, $\beta$ the angle of incidence of light on a mirror segment when the distant and near objects are in alignment with the focal axis of the lens, $U_1$ the distance of a distant object to the mirror segment reflecting the objects on a median line and from the mirror segment to the lens, and $U_2$ the distance of a near object to the mirror segment reflecting the objects on a median line and from the mirror segment to the lens, N the revolutions per second of the mirror segments, S the number of segments to form a complete circle, and $t$ the reaction time for the fusion of images for the average eye.

8. In a method of making motion pictures comprising reflecting light from at least two mirrors one of which is movable, projecting the light from the mirrors through the optical system of a camera to obtain lateral visual displacement, visually observing the lateral movement of the images, and manually adjusting the spacing of the mirrors while maintaining the operation of the mirrors to reduce the relative weaving motion to the desired degree of a relatively near and distant point of the scene to be photographed.

9. In a method of making motion pictures as claimed in claim 8, then photographing the scene through the same optical system of the camera when synchronizing the movement of the film and the mirror to obtain photographs of light reflected from each mirror on successive panels of the film.

10. A motion picture apparatus comprising in combination, at least a pair of parallel mirrors positioned to reflect light in the same general direction, means to rotate at least one of the mirrors on an axis through the planes of the mirrors, means to position the optical system of a camera to receive the light from an object reflected by the mirrors, means to visually observe the lateral displacement of the images, manually operable means to adjust the spacing apart of the mirrors while maintaining the operation of the mirrors to reduce to a desirable degree the relative weaving motion of a relatively near and distant point in a scene to be photographed.

11. A motion picture apparatus having a plurality of parallel segmental mirrors always spaced apart in parallel planes in which two or more mirrors rotate on an axis normal to said mirrors, means to direct light from a scene to be photographed on to the said mirrors and from the mirrors through the optical system of a camera, one of said mirrors reflecting light on a median axis, the other mirrors reflecting light on an axis displaced on opposite sides of the median axis, an adjusting means for simultaneously spacing the various mirrors at equal distances from each other and in reference to the mirror reflecting light on the median axis.

12. A motion picture apparatus as claimed in claim 11, said adjusting means including an actuating device having means operable to adjust the mirrors to obtain a lateral displacement on successive panels of a film of a single object in accordance with the formula $$l = f\frac{2b \cos \beta}{U}$$

in which $l$ equals the lateral displacement on the film of the two images of the same object, $f$ is the focal length of the lens, $b$ is the distance apart of the mirrors used in forming the two images, $\beta$ is the angle of incidence of the light from the object on the mirror segments, and U is the distance of the path of light from the object to the mirror and from the mirror to the lens.

13. A motion picture apparatus as claimed in claim 11, said adjusting means including an actuating device having means operable to adjust the mirrors to obtain a lateral displacement of a near and distant object which are in alignment in the median axis on one panel and are laterally displaced on another panel in accordance with the formula $$l_2 - l_1 = 2fb \cos \beta \left(\frac{U_1 - U_2}{U_2 U_1}\right)$$

in which $l_2$ is the distance of greatest lateral displacement of one of the images, $l_1$ the distance of least lateral displacement of the other image from the median line, $f$ is the focal length of the lens, $b$ is the distance apart of the segmental mirrors used in forming the two sets of images, $\beta$ is the angle of incidence of light from the aligned objects in the median line to the mirror segments, $U_1$ is the distance of the path of light in the median line from the distant object to the mirror and from the mirror to the lens, and $U_2$ is the distance of the path of light in the median line from the object to the mirror and from the mirror to the lens.

14. A motion picture apparatus as claimed in claim 11, said adjusting means including an actuating device having means operable to adjust the mirrors to obtain a lateral displacement of a near and distant object which are in alignment in the median axis on one panel and are laterally displaced on another panel in accordance with the formula $$G = 2bf \cos \beta \left(\frac{U_1 - U_2}{U_1 U_2}\right) NSt$$

in which G is the lateral displacement of the two second images of the distant and near objects, $b$ is the distance apart of the mirror segments, $f$ is the focal length of the camera lens, $\beta$ the angle of incidence of light on the mirror segments when the distant and near objects are in alignment with the focal axis of the lens, $U_1$ the distance of a distant object to the mirror segment reflecting the objects on a median line and from the mirror segment to the lens, and $U_2$ the distance of a near object to the mirror segment reflecting the objects on a median line and from the mirror segment to the lens, N the revolutions per second of the mirror segments, S the number of segments to form a complete circle, and $t$ the reaction time for the fusion of images for the average eye.

15. An apparatus for making motion pictures comprising, in combination, a supporting structure adapted for connection to a camera mounting, a housing on said structure having a rotatable shaft, a plurality of mirror segments mounted on said shaft, said segments being always spaced in parallel planes, each segment rotating in a different plane from that of the next adjacent segment, means to adjust the spacing between the segments considered longitudinally of the shaft to maintain the same spacing between adjacent segments, means to direct an incident ray of light from objects to be photographed on the mirrors when in one position during their rotation, said camera mounting being adapted to position a camera to receive the reflected light from the mirror segments.

16. An apparatus for making motion pictures as claimed in 15, the adjusting means to space the segments being connected to the mirror segments to move all but one segment, and the other segments being moved simultaneously towards or from the said one segment.

17. An apparatus for making motion pictures as claimed in 15, the mirror segments being parallel and at right angles to the said shaft.

18. An apparatus for photographing motion pictures, comprising a plurality of movable reflectors, said reflectors being in different parallel planes always spaced apart, means to direct an incident ray of light to the reflectors, means to mount a moving picture camera to receive and photograph the images reflected from the successive reflectors when in a definite location during their movement and manually operable means to vary the relative parallel spacing of the reflectors to vary the displacement of the images.

19. An apparatus for photographing motion pictures, comprising a plurality of rotatable reflectors, means continually rotating each reflector in a different and parallel plane, always spaced apart, from the plane of rotation of the other reflectors, means to direct an incident ray of light from objects to be photographed on the various reflectors when in one position of their rotation, means to mount a camera to receive the reflected light and to photograph laterally displaced images on the film in the camera, and means to vary the relative spacing of the reflectors to vary the displacement of the images laterally as to the film.

20. An apparatus for photographing motion pictures as claimed in claim 19, the means to vary the spacing of the reflectors comprising a manually operable device and a connection from said device to the reflectors, said connection being operative to vary the spacing of the reflectors while the rotating means maintains the rotation thereof.

21. A motion picture apparatus as claimed in claim 52, means to vary the spacing of said reflecting positions of the secondary reflecting means while maintaining the operation of the movable reflecting means.

22. A motion picture apparatus as claimed in claim 52, an adjusting means to vary the spacing of the reflecting positions of the secondary reflecting means, and scales having means to indicate the said spacing, whereby the lateral displacement of the ray of light may be corrected in accordance with the distance of objects to be photographed.

23. A motion picture apparatus as claimed in claim 52, an optical system of a camera with an observation screen mounted on the first guideway, whereby the images formed by reflection may be observed and means to vary the spacing of the said reflecting positions of the secondary reflecting means while operating the movable reflecting means to regulate the apparent weaving motion of portions of the observed images to a suitable degree.

24. A motion picture apparatus comprising in combination a camera having an optical system and including a support for a film and an observation screen, a first fixed reflector for incident light, a plurality of segmental mirrors, each connected to a common shaft the mirrors being always spaced in parallel planes and surrounding the shaft, and means to operate the camera and rotate the said shaft in synchronism, whereby the reflections from the rotating mirrors form a sequence of displaced images in the camera and means for shifting the camera to align the film support or the observation screen to alignment with the reflections from the rotating mirrors.

25. A motion picture apparatus as claimed in claim 24, and means to vary the spacing of the rotating mirrors axially of the shaft, said means maintaining the same spacing between adjacent segmental mirrors to cause a change in the displacement of the images.

26. A motion picture apparatus as claimed in claim 24, an adjusting means to vary the spacing of the mirrors one from another on the shaft, and scales connected therewith, the scales indicating the spacing apart of the mirrors in relation to the axis of the shaft.

27. A motion picture apparatus as claimed in claim 24, the said camera being operative to at will form images on a film or on the screen and means to adjust the spacing of the reflectors axially of the shaft while rotating the mirrors to reduce an apparent weaving motion of the various portions of the image to a desired degree.

28. In the method of making motion pictures of a single object, using a plurality of parallel reflecting planes, in which the focal length of the lens of the camera is $f$, the distance apart of the parallel reflecting planes is $b$, the angle of incidence of light from the object on the reflecting planes is $\beta$, and the distance of the path of light from the object to a reflecting plane and from the reflecting plane to the lens is U, comprising in the desired sequence causing the reflection from one plane at a time to obtain a lateral image displacement on the film in two adjacent panels the distance $l$, and regulating the distance apart of the reflecting planes whereby the displacement $$l = f \frac{2b \cos \beta}{U}$$

29. In the method of making motion pictures of a near and a remote object by the reflection of light in the desired sequence from parallel spaced planes to cause a near and remote object and their images on one panel to be in alignment with the median focal axis of the lens when the reflection is from one plane and in which $U_1$ represents the distance of the path of light in the median line from the remote object to a reflecting plane and from the plane to the lens and $U_2$ is the distance of the path of light in the median line from the near object to a reflecting plane and from such reflecting plane to the lens and in which $b$ is the distance apart of adjacent reflecting planes used in forming two adjacent panels and $\beta$ is the angle of incidence of light from the aligned objects in the median line to the reflecting planes and in which $f$ is the focal length of the lens, whereby in other panels the distance of greatest lateral displacement of one of the images is $l_2$ and the distance of least lateral displacement of the other image from the median line is $l_1$, comprising regulating the spacing apart of the reflecting planes by the formula $$l_2 - l_1 = 2fb \cos \beta \left( \frac{U_1 - U_2}{U_2 U_1} \right)$$

30. In the method of making motion pictures of a near and remote object by the reflection of light from a sequence of parallel spaced planes being brought into operation in a cycle at a definite speed, in which images of the objects are formed on one panel of a film, in the median focal line with the two objects in such line, using as factors $b$ as the distance apart of the reflecting planes, $f$ as the focal length of the camera lens, $\beta$ as the angle of incidence of light on a reflecting plane when the near and remote objects are in alignment on the median line with the focal axis of the lens, $U_1$ is the distance of a remote object to a reflecting plane on the median line and from such reflecting plane to the lens and $U_2$ is the distance of a near object to the same reflecting plane and from such plane to the lens, N represents the number of cycles per second of a sequence of reflections, S represents the number of separate reflections to form a complete cycle, $t$ represents the reaction time for the fusion of images for the average eye, also forming on a second panel a second set of images of the near and remote object by reflection of light from a second plane and regulating the distance apart of the reflecting planes to cause a lateral displacement G of the two second images, such regulation of the reflecting planes being governed by the formula $$G = 2bf \cos \beta \left( \frac{U_1 - U_2}{U_1 U_2} \right)$$

31. In the method of making motion pictures of a single object in which successive images of such object are formed on successive panels of a film, comprising laterally reciprocating a camera lens with the film in a rectilinear line to form the successive images on the successive panels, causing a lateral displacement of the images on successive panels by the measurement $l$, using the factor V as the focal length of the lens, L the amount of lateral movement of the lens for photographing successive panels and U the distance of the single object from the lens, and regulating the lateral displacement of the camera lens and film to be governed by the equation $$l = \frac{VL}{U}$$

32. A motion picture photographing apparatus comprising in combination a motion picture camera having an intermittent film feed and a shutter, a rotatable shaft, a pair of mirror segments with reflecting plane surfaces each operatively connected to said shaft to have their reflecting surfaces in parallel planes, whereby on rotation of the shaft the reflecting surfaces of the segments always rotate in parallel planes spaced longitudinally of the axis of the shaft, means to direct the incident ray of light from an object to be photographed on each segmental mirror in a sequence when it occupies a definite location in its rotation, means to position the camera to receive the rays reflected from each mirror segment in the sequence, and means to synchronize the movement of the film and the shutter of the camera and the rotation of the mirrors to reflect the light from each mirror in succession while the film is stationary and the shutter open, whereby on successive panels of the film images are formed in a sequence displaced left, right, left, right, etc.

33. A motion picture photographing apparatus as claimed in claim 32, and manually controlled means connected to at least one of the mirrors to adjust the spacing of the two rotating mirrors longitudinally of the shaft equally in reference to a middle distance plane between the two mirrors to thereby vary the amount of displacement of the images.

34. A motion picture photographing apparatus comprising in combination a motion picture camera having an intermittent film feed and a shutter, a rotatable shaft, at least four mirror segments with reflecting plane surfaces each operatively connected to said shaft, a first and a second of said mirrors being in the same plane, the third and fourth mirrors being in planes equally spaced on the axis of the shaft from the plane of the first and second mirrors, means to rotate the mirrors while maintaining the reflecting surfaces of the third and fourth mirrors in planes parallel to that of the first and second mirror surfaces, means to direct the incident ray of light from an object to be photographed on each segmental mirror in a sequence when it occupies a definite location in its rotation, means to position the camera to receive the rays reflected from each mirror segment in a sequence, and means to synchronize the movement of the film, the shutter of the camera, and the rotation of the mirrors to reflect light from each mirror in succession while the film is stationary and the shutter open, whereby on successive panels of the film images are formed in a sequence displaced: left, center, right, center, left, center, etc.

35. A motion picture photographing apparatus as claimed in claim 34, a manually controlled means connected to at least two of the mirrors to adjust the spacing of the mirrors longitudinally of the shaft while rotating the mirrors to maintain an equal distance between the third and the plane of the first and second, and between the fourth and the plane of the first and second mirrors to thereby vary the amount of displacement of the images.

36. In the method of making motion pictures from light reflected on a film by segmental mirrors rotating in parallel planes in which $f$ is the focal length of the lens, $b$ is the distance apart of the plane of the mirrors and $\beta$ is the angle of incidence of the light from an object on a mirror segment, and $U$ is the distance of the path of light from the object to the mirror and from the mirror to a camera lens, comprising photographing when one mirror segment is in the path of light an image of a single object which is on the optical axis of the lens on one panel of the film, and when another mirror segment is in the path of light a second image on a second panel of the film forming a lateral displacement of said images relative to each other and regulating such displacement by the formula $$l = f \frac{2b \cos \beta}{U}$$

in which $l$ is the lateral displacement on the film of the two images of the same object.

37. In the method of making motion pictures with light reflected on a film by segmental mirrors rotating in parallel planes in which $f$ is the focal length of the lens, $b$ is the distance apart of the planes of these segmental mirrors used in forming two sets of images, $\beta$ is the angle of incidence of light from two aligned objects in the median line to the mirror segments, $U_1$ is the distance of the path of light in the median line from a distant object and $U_2$ from a near object to the mirror and mirror to the lens, comprising photographing two first images on a first panel of the film by light reflected by a first mirror segment of a near and distant object in alignment with the focal axis of the lens on a median line on the first panel, and forming two second images on a second panel by light reflected from a second mirror segment, displacing the two second images laterally from each other regulated by the formula $$l_2 - l_1 = 2fb \cos \beta \left( \frac{U_1 - U_2}{U_2 U_1} \right)$$

in which $l_2$ is the distance of lateral displacement of the greatest displaced image and $l_1$ is the distance of lateral displacement of the least displaced image on the second panel from the median line.

38. A motion picture apparatus as claimed in claim 10, means adapted for shifting the camera to align a film with the optical system of the camera, and means to synchronize the motion of the film and the movable mirrors to obtain photographs from each mirror on successive panels of the film while keeping the adjusted spacing apart of the mirrors obtained during the visible observation of the images.

39. In the method of making a motion picture of a near and remote object in which the distance from the lens to the remote object is $U_1$ and the near object $U_2$, photographing the objects in succession on successive panels of a film, whereby on the first panel the images and the objects are in the optical median line of the lens and in adjacent panels the images of the near and remote objects are displaced one from another, the images in the panels preceding and following the first panel being displaced on opposite sides of said median line and regulating the displacement of the images one from another on the same panel of the film by a factor $$\frac{U_1 - U_2}{U_1 U_2}$$

40. In the method of making motion pictures of a near and a remote object, in which the distance from the camera lens to the remote object is $U_1$ and to the near object is $U_2$, comprising laterally reciprocating a camera lens and film in a rectilinear direction, the focal length of the camera lens being $V$ and the distance of lateral movement of the film for photographing successive panels from a median optical line being $L$, photographing the objects on successive panels of the film whereby when the camera is in its median position the two images on the first panel and the two objects are on a median optical line, and when the camera is completely displaced laterally from its median position, on the adjacent panels the images are formed on opposite sides of the median line, and regulating the displacement of the images in the panels having a displacement relative to the median line by a factor $$VL \left( \frac{U_1 - U_2}{U_1 U_2} \right)$$

41. In the method of making motion pictures of a near and remote object, in which the distance from the lens to the remote object is $U_1$ and to the near object $U_2$, comprising laterally oscillating a camera with the film in an arc, the focal length of the camera lens being $V$, the oscillation of the camera from the position of the lens when the objects are in the median optical line being $S_1$, photographing the objects on successive panels of the film whereby when the camera is in its median position the two images on the first panel and the two objects are in a median optical line, and when the camera is completely displaced laterally from its median position on adjacent panels the images are formed on opposite sides of the median line, and regulating the displacement apart of the images of the two objects in the various panels on each side of the median line by the factor $$S_1 V \left( \frac{U_1 - U_2}{U_1 U_2} \right)$$

42. A motion picture apparatus comprising in combination a supporting structure for a camera, a hollow dustproof housing connected thereto and having a first relatively large plane glass window for incident light rays, a fixed relatively large primary mirror to receive the incident rays, a movable optical system having relatively smaller secondary reflecting means to receive light rays reflected by the primary mirror, a second relatively small plane glass window through which light rays from the movable optical system are directed to a camera, and means to so move the secondary reflecting means to produce in the camera a sequence of laterally offset images on successive panels of a film.

43. A motion picture apparatus as claimed in claim 42, the axis of the secondary reflecting means being fixed relative to the housing, and means to adjust and secure the primary mirror as to the housing, the incident light rays and the secondary reflecting means.

44. A motion picture apparatus as claimed in claim 42, the supporting structure having a transverse guideway for laterally shifting the camera for focusing and photographing on a film.

45. A motion picture apparatus as claimed in claim 42, the housing being adjustably mounted on a longitudinal guideway for regulating the distance of the second window from a camera lens, the axis of the secondary reflecting means being fixed relative to the housing, means to adjust and secure the primary mirror as to the housing, the incident light rays and the secondary reflecting means, and the supporting structure having a transverse guideway for laterally shifting the camera for focusing and photographing on a film.

46. A motion picture apparatus as claimed in claim 42, the housing being adjustably mounted on a longitudinal guideway for regulating the distance of the second mirror from the camera lens.

47. A motion picture apparatus as claimed in claim 42, the supporting structure having a transverse guideway for laterally shifting the camera for focusing and photographing on a film, and the housing being adjustably mounted on a longitudinal guideway for regulating the distance of the second mirror from the camera lens.

48. In the method of making motion pictures, reflecting light from an object to be photographed by at least two parallel mirrors, reflecting light in the same general direction and in which at least one mirror rotates on an axis at right angles to a plane of the mirrors, projecting the reflected light through the optical system of a camera on to a film, synchronizing the motion of the film and the rotating mirror to obtain relatively laterally displaced images from each mirror on successive panels of the film, and manually adjusting the spacing of the mirrors while maintaining the operation of the mirrors to reduce an undesirable weaving motion of a relatively near and distant point in the objects to be photographed while maintaining the camera and the reflected light in the same relative positions except for the rotating movement of one of the mirrors and the manual spacing of the mirrors, prior to photographing the images, observing through the optical system of the camera the lateral displacement of the images by the operating mirrors and making the manual adjustment of the spacing of the mirrors during such observation to reduce to a desired degree the weaving motion of a relatively near and distant point in the object to be photographed.

49. In motion picture apparatus, comprising in combination a motion picture camera having an optical system, a first single reflector for incident light fixed relative to the camera, a movable secondary reflecting means positioned to reflect light from the fixed reflector to the optical system of the camera, means to operate the reflecting means to develop a sequence of separate reflections from different positively spaced positions in the path of light to cause a sequence of lateral displacements of successive images formed in the camera, means to vary the spacing of the secondary reflecting means to vary the sequence of reflections therefrom while maintaining the movement of the said secondary reflecting means to thereby vary the relative displacement of the successive images.

50. In motion picture apparatus, comprising in combination a motion picture camera having an optical system, a first single reflector for incident light fixed relative to the camera, a movable secondary reflecting means positioned to reflect light from the fixed reflector to the optical system of the camera, means to operate the reflecting means to develop a sequence of separate reflections from different positively spaced positions in the path of light to cause a sequence of lateral displacements of successive images formed in the camera, means to form a visual image in the camera while moving the secondary reflecting means, and means to vary the spacing of the positions of reflection to reduce an apparent weaving motion of different parts of the image to a desired degree.

51. In motion picture apparatus, comprising in combination a motion picture camera having an optical system, a first single reflector for incident light fixed relative to the camera, a movable secondary reflecting means positioned to reflect light from the fixed reflector to the optical system of the camera, means to operate the reflecting means to develop a sequence of separate reflections from different positively spaced positions in the path of light to cause a sequence of lateral displacements of successive images formed in the camera, means to adjust the spacing of the secondary reflecting means to vary the sequence of reflections therefrom and scales to indicate the correct position of said adjusting means for different distances of objects to be photographed.

52. A motion picture apparatus comprising in combination a supporting structure with a first guideway adapted for the mounting and lateral movement of a camera, a second guideway having a dustproof housing adjustably mounted thereon, said housing having a first plane glass window for incident light and a second plane glass window for reflected light, adapted for alignment with the optical system of the camera, a first mirror fixed as to the housing and camera to receive the incident light, a secondary movable reflecting means to reflect light from the fixed mirror through the second window constructed and adapted to develop a sequence of separate laterally displaced reflections and means to operate the reflecting means to develop a sequence of separate reflections from different positively spaced positions in the path of light and thereby cause in sequence a lateral displacement in the camera of a ray of light from an object to be photographed through the second opening.

53. A motion picture photographing apparatus in which a motion picture camera having a film feed, a shutter and a lens is combined with at least three movable reflectors mounted to move in parallel planes, said planes always being spaced apart to provide a central plane and a plane near and a plane remote relative to the lens and each reflector having an approximately similar angular relation to an incident ray of light when in position to reflect light from an object to be photographed to the camera lens and with the optical axis of the reflectors in the central plane in the optical axis of the lens and the optical axis of the reflectors in the near and remote plane slightly displaced from the axis of the lens, means to move the reflectors to bring them in a repeating sequence in the path of light rays from the object to the lens, and means to synchronize the movement of the reflectors and the film feed and shutter of the camera to produce reflections of light from the object to the lens from the reflectors in the near, the central and remote planes relative to the lens whereby on successive frames of the film are formed in sequence images having the relative displacement of left, center, right, center, left, in a repeating cycle.

54. A motion picture photographing apparatus as claimed in claim 53, said movable reflectors having a first reflector always movable in the same plane and one or more secondary reflectors adjustable in parallel planes to and from the first reflector, and means to adjust the secondary reflectors as to their plane of movement, said adjusting means being operative while the reflectors are moving to vary the spacing apart of the planes of movement of the reflectors.

W. F. ALDER.